Dec. 16, 1969  E. A. UZDAVINES  3,484,231
METHOD OF CONVERTING SCRAP AUTOMOBILE BODIES TO HIGH GRADE PIGS
Filed April 7, 1966  2 Sheets-Sheet 1
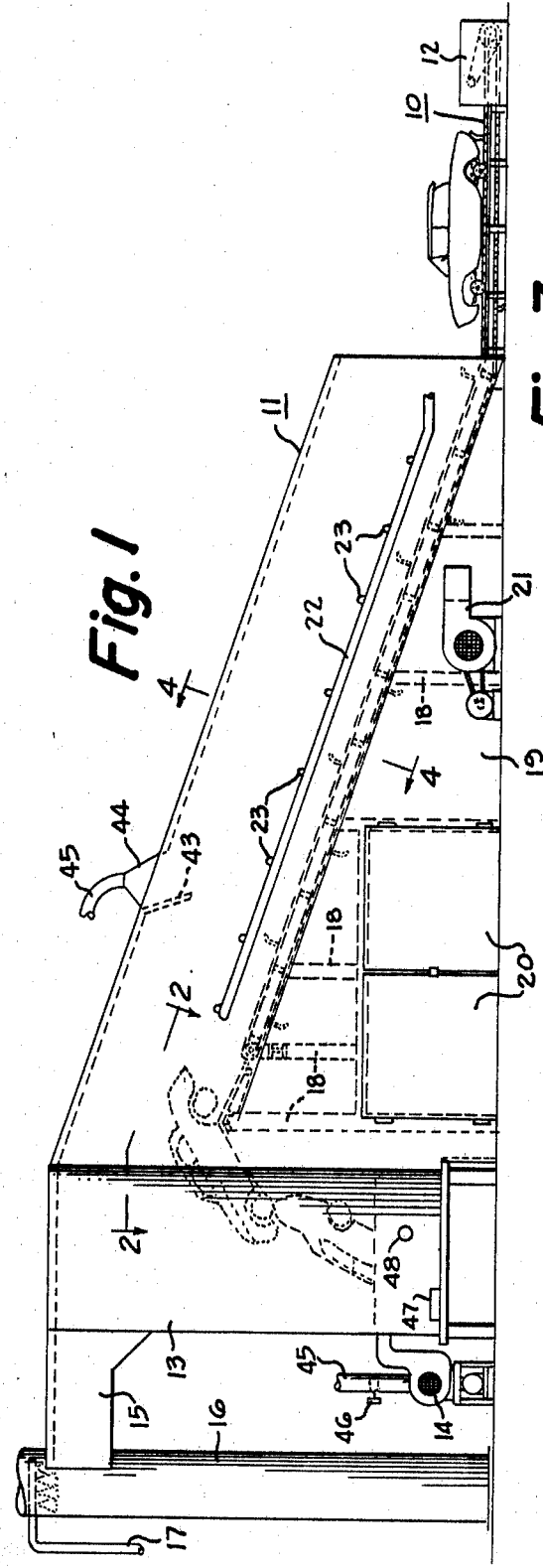
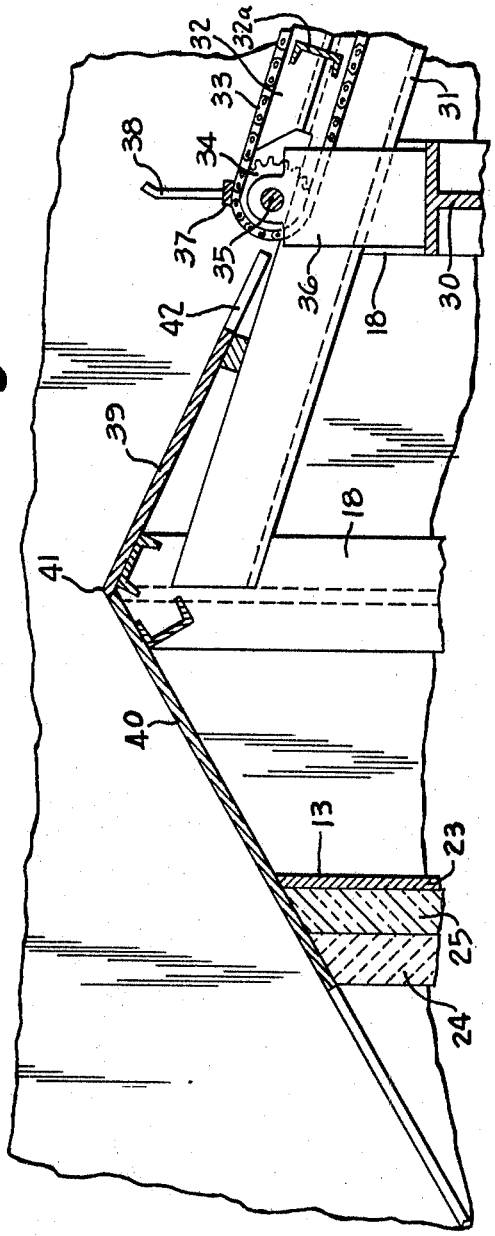
INVENTOR
EDWARD A. UZDAVINES
BY *Walter B. Udell*
ATTORNEY

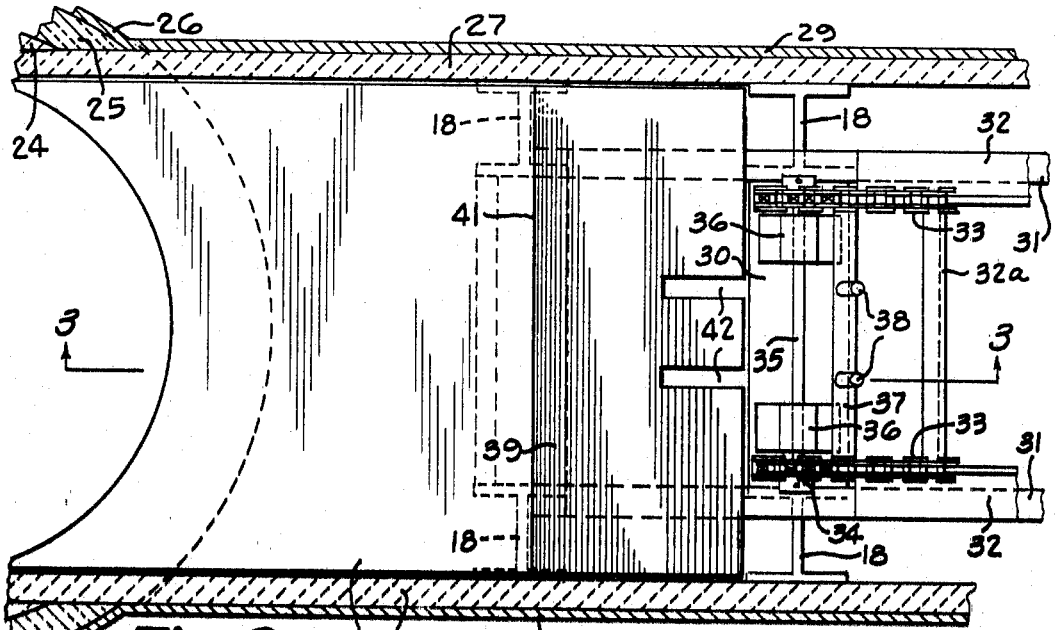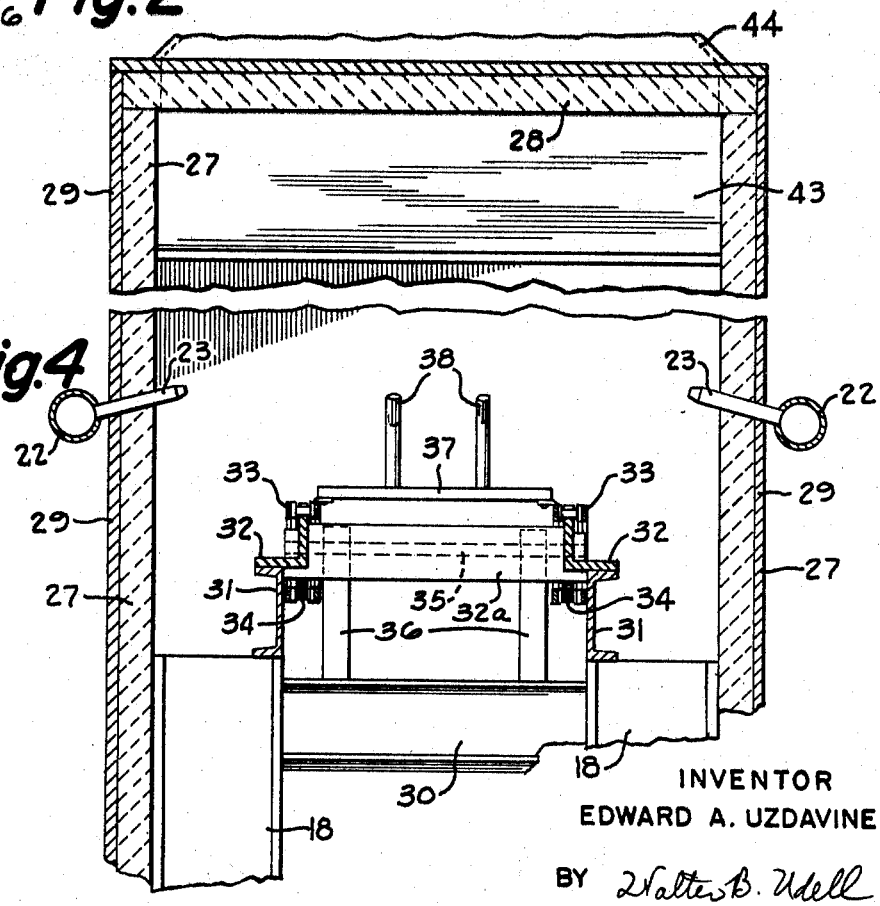

United States Patent Office 3,484,231
Patented Dec. 16, 1969

3,484,231
METHOD OF CONVERTING SCRAP AUTOMOBILE BODIES TO HIGH GRADE PIGS
Edward A. Uzdavines, Philadelphia, Pa.
(124 Moore St., Woodbury Heights, N.J. 08097)
Filed Apr. 7, 1966, Ser. No. 540,876
Int. Cl. C21b 5/00
U.S. Cl. 75—43
10 Claims

ABSTRACT OF THE DISCLOSURE

Scrap automobile bodies are stripped of contaminant chromium and copper, placed on a conveyor moving angularly upward through a thermally insulated housing and ignited so that all combustibles and low temperature melting metals are removed by the time that each car reaches the upper end of the housing which latter opens into a cupola. The cars are deposited successively into the cupola and melted down to high grade steel which is tapped off and pigged. Incomplete combustion products produced in the housing in the form of smoke are drawn off and forced through the cupola bed to complete the combustion and eliminate air pollution.

---

This invention relates generally to the conversion of discarded or scrap automobile bodies into a form directly usable as a high grade charge for a steel furnace. More particularly, this invention relates to a method of converting such scrap automobile bodies into high grade, high density pigs refined to such a state of purity that no additional processing by the steel mill is required prior to use.

Steel mills require high density high grade scrap steel for use as charges for steel furnaces in order to produce the requirements of industry. Unfortunately, it is extremely difficult to obtain sufficient quantities of high grade steel scrap because the sources of such scrap are heavily contaminated with materials adversely affecting the physical and chemical characteristics of any steel produced from such scrap. This problem is so acute that those steel plants finding it necessary to utilize such low grade scrap have been required to establish scrap preparation plants in which the scrap is treated and purified before use, such pretreatment being reflected in substantially increased costs of production and resulting in higher costs per ton of produced steel.

One of the major sources of such low grade scrap steel is discarded or junked automobile bodies which have been mechanically densified in various ways. It is for example, common practice to first dismantle the bodies by physically removing the doors, trunk lids and engine hoods, and then cut up the remainder of the body and/or frame to provide relatively large panels or sections which may then be mechanically shredded with mangling devices to produce smaller metal fragments. These fragments are then sometimes processed through a magnetic separating apparatus to roughly sort the basically ferrous from the nonferrous metals. The shredded materials, whether separated or not, may then be compressed by presses or drop hammers into sheets of material which subsequently may be sliced into strips and then baled. Sometimes the shredded material is baled directly, and in some cases the large sections are compressed into a bale without having been first shredded. In any event, all of these methods result in relatively low density, highly contaminated scrap material containing excessive amounts of phosphorus, sulfur, chromium, copper and carbon or carbon forming substances.

In some cases attempts to reduce the contaminants by burning of the discarded automobile bodies has been attempted, but the results have not been satisfactory because of the relatively low temperatures achievable by open dump type burning. Moreover, most communities now prohibit such burning procedures under their air polution statutes and ordinances. The low grade of scrap which consequently results from the aforedescribed treatments of discarded automobile bodies is not readily salable so that such old and discarded automobile bodies are not in demand for scrap salvage purposes. As a result, more and more communities are finding themselves with large numbers of old abandoned cars' accumulating on their streets and roadways, and salvage yards are finding it more and more difficult to dispose of such car bodies when they have been stripped of whatever salable parts were salvagable.

All of the foregoing problems are overcome by the method according to the present invention by means of which scrap automobile bodies are economically converted into high grade pigs or billets which meet the requirements of the steel mills so that no further processing of the pigs is required prior to use. Some mills will accept in this category pigs containing not more than .05% of phosphorus and sulfur; some mills will not accept pigs containing more than 0.5% of chromium; some mills require carbon content not in excess of 2%; and substantially all mills consider as highly undesirable a copper content in excess of .15%. Accordingly, it is a primary object of my invention to provide from discarded automobile bodies high grade pigs having an assay which simultaneously falls below all of the foregoing maximum contaminant limitation conditions. Another object of my invention is to provide a method for converting discarded automobile bodies into high grade pigs which reduces the costs by automatically generating by-products which are separately salable, such as aluminum and zinc or white metal, and which does not require dismemberment of the car bodies into sub-parts but which operates on the entire car as a unit.

A further object of my invention is to provide a novel method as aforesaid which utilizes an aggregative self consumption combustion technique that creates no air pollution problem by the novel utilization of an after burner or double combustion technique.

Still another object of my invention is to provide a novel method as aforesaid which utilizes a continuous flow processing system capable of converting a car body of normal size into molten steel in approximately four minutes, and which includes means for increasing the conversion rate if desired.

The foregoing and other objects of my invention will appear more fully hereinafter from a reading of the following specification in conjunction with an examination of the appended drawings, wherein;

FIGURE 1 is a side elevational view of apparatus for practicing the method according to the invention with some internal features being illustrated in dotted line;

FIGURE 2 is a horizontal cross sectional view on an enlarged scale as would be seen when viewed along the line 2—2 of FIGURE 1;

FIGURE 3 is a vertical sectional view through that portion of the apparatus also shown in FIGURE 2, as would be seen when viewed along the line 3—3 thereof; and FIGURE 4 is a substantially vertical cross sectional view on an enlarged scale through the apparatus of FIGURE 1 as would be seen when viewed along the line 4—4 thereof.

In the several figures, like elements are denoted by like reference characters.

Briefly, my invention contemplates the processing of scrapped automobile bodies by taking the scrapped body as is with all of the contaminants present such as glass, wood, upholstery, carpeting, undercoating and the like and first placing it on a conveying device which will carry the body from substantially ground level to a higher level along an inclined plane and drop the body into a cupola or melting furnace to reduce it to a molten state. However, while the car body is on its way up the inclined plane to be deposited in the cupola it is ignited and burned to remove all of the contaminants, so that by the time the body is ready to be deposited into the cupola for melting it is in a substantially clean state. Some contaminants, such as glass, which might still be present are melted down in the cupola with the metal of the car but remain at the surface of the molten mass as a slag layer physically separated from the molten metal. The cupola is then periodically tapped to draw off the molten metal into pig or billet forming molds, and the slag is separately tapped and disposed of in any desired manner, as for example as sanitary fill or for aggregate for concrete mixes.

The apparatus to be now described for carrying out the novel method according to the invention provides a continuous flow type of conversion system which utilizes the heat generated by combustion from one car body for raising the temperature of other car bodies preceeding it on the conveyor, and means are provided for controlling the temperature to which the car bodies are raised prior to deposition into the cupola together with means for eliminating air pollution by collecting any incomplete combustion products and subjecting them to intense heat to thereby complete combustion and eliminate smoke production.

Referring now to the drawings, and most particularly to FIGURE 1, there is seen a chain conveyor designated generally as 10 having its right end out in the open and disposed for horizontal run slightly above ground level. The conveyor extends to the left into an enclosed housing designated generally as 11 and inclines upward through the housing at an angle of approximately twenty degrees to the horizontal to a terminating point near the upper end of the housing. The chain conveyor 10 is of the endless loop type having sprockets at opposite ends of the run as will be described more fully hereinafter with respect to the showings of FIGURES 2 and 4. The chain conveyor is driven from the lower end of the run by means of motor drive 12 which may suitably be an electric motor or a liquid fuel internal combustion engine coupled to the conveyor through a speed reducer.

The upper end of the enclosed housing 11 opens through a side wall portion into a cupola 13 which latter in operation produces an internal temperature of substantially 3000° F. through proper fueling and forced draft provided by means of an air blower 14 connected to the cupola to blow air thereinto at the lower end. The fly ash type of combustion products generated in the cupola 13 are carried upward and to the left through stack 15 and into wash tower 16 where they are washed downward by the water spray injected into the wash tower 16 at its upper end through water supply line 17.

The chain conveyor 10 is supported within the housing 11 on support columns designated generally as 18, and the housing side walls 19 are also secured to the columns. Fitted into the housing side walls 19 and of sufficient size to permit a truck to pass therethrough are doors 20 which are normally closed when the apparatus is in use. Positioned outside of the enclosed housing 11 is an air blower 21 having an outlet duct opening through the housing side wall 19 toward the lower end and below the level of the chain conveyor 10, the blower 21 when operated providing a forced air draft into the enclosed housing 11 and upward through the open bottom of the conveyor 10. Extending along the outside of the enclosed housing 11 on opposite sides thereof parallel to and somewhat above the chain conveyor 10 are fuel manifolds 22 from which extend through the housing side walls 19 into the enclosed housing 11 a plurality of jet burners 23 spaced along the manifold 22 which latter is connectable in a suitable manner to a fuel supply, not shown.

As best seen from FIGURES 2 and 3, the walls of the cupola 13 are formed from layers of refractory material 24 and 25 covered by an external sheathing 26. As best seen from FIGURES 2 and 4, the enclosed housing 11 is constructed with interior walls 27 and roofing 28 made of refractory material enclosed within an external sheathing 29 which forms the visible external surface of the housing 11. The housing lining walls 27 extend through the inlet opening in the cupola 13 and provide a continuous refractory lining with the cupola wall material 24 and 25. As best seen from FIGURES 1, 3 and 4, a plurality of horizontal beams 30 extend transversely of the housing 11 and are secured to the support columns 18 below the upper ends thereof to rigidize the structure. Running longitudinally upward through the housing 11 on the upper inner ends of the columns 18 are channel members 31, upon the upper flanges of which are secured angles 32 positioned so that their vertically extending legs form parallel extending tracks for the upper run of the movable chain 33 of the chain conveyor structure 10. The angles 32 are rigidly interconnected by the channels 32a extending transversely therebetween and suitably secured, as by welding.

At the upper end of the conveyor, the movable chains 33 are each trained about a sprocket 34 secured upon opposite ends of an axle shaft 35 journalled for rotation in bearing blocks 36 secured upon and carried by the uppermost beam 30. Extending transversely between and fixedly secured to both movable chains 33 at substantially car length intervals along the length of the conveyor are tie bars 37 from which upwardly extend car holding anti-backslide bars 38 which are adapted to engage behind the rear end of the car body to not only prevent backsliding of the vehicle as it is moved upward through the housing 11, but also to provide push off force at the upper end of the conveyor for moving the car body off of the conveyor and onto the ramp consisting of skid plates 39 and 40 most clearly shown in FIGURES 2 and 3.

The length of the skid plate 39 from the upper end of the conveyor to the peak point 41 is chosen so that the center of gravity of the car body riding onto the skid plate 39 from the chain conveyor passes the peak point 41 due to the positive drive of the anti-backslide bars 38 so that the car body tips over and down onto skid plate 40. The length of skid plate 40 is such compared to the car body length that the front end of the car body extends inward into the cupola 13 while the remainder of the body rests on skid plate 40 at an angle which permits the car body to slide forward into the cupola until it engages the unmelted upstanding part of the preceding car body. The car body thus sits on skid plate 40 until the car body immediately in front of it in the cupola melts down sufficiently to permit it to gradually slide forward and drop end first downward into the cupola 13. As also best seen from FIGURES 2 and 3, the conveyor end of skid plate 39 is slotted out as at 42 to permit passage therethrough of the anti-backslide bars 38 as the latter rotate about the front end of the conveyor sprockets 34 into dependent position from the lower run of the chain 33.

As best seen from FIGURES 1 and 4, the enclosed housing 11 is provided at about two thirds of its length upward with a baffle 43, depending from the roof lining 28 of the housing and extending the full width thereof, which collects and directs upwardly flowing smoke and combustion products into the hood 44 opening down through the roof of the housing 11, the outlet of the hood 44 cnnecting to a duct 45 which runs downward to an inlet on the cupola air blower 14. The duct 45 is provided with a butterfly or other suitable type of valve 46 operative to control and proportion the flow into the blower 14 of the combustion products flowing through the duct 45 for mixing with outside air and injection into the cupola.

Referring back now particularly to FIGURE 1, the system operates in the following manner. First, all of the salable parts are salvaged from the automobile, and this would normally include such items as hubcaps, wheels, alternators or generators, fans, voltage regulators and the like. In some instances the engine block itself may be salable and would be removed. Next, any chrome body trim and bumpers which have not been salvaged are removed and discarded if it is necessary or desirable to hold the chromium metal content of the finished pigs below the .05% by weight maximum limitation. This removal is necessary because chromium melts at a higher temperature than steel, approximately 2800° F., so that it cannot be preseparated. Following this, all of the accessible copper is removed, such as the electrical wiring, starting motor and solenoid, and generator or alternator if these things have not already been removed.

The upholstery and fabric parts of the vehicle are wetted down with an inflammable fluid and the car body is lifted onto the conveyor lower horizontal section by a crane, as shown in FIGURE 1. The moving conveyor 10 carries the car body into the enclosed housing 11 and starts it up the ramped section of the conveyor. As soon as the car body enters the housing 11 the upholstery is ignited and the car begins to burn, the heat and smoke generated moving upward through the housing 11.

The cupola 13 has of course been fired and is up to operating temperature which is about 3000° F., forced draft being provided by the blower 14 which is back coupled through the duct 45 and hood 44 to the enclosed housing 11. Thus, by adjustment of the butterfly valve 46 a partial vacuum or negative pressure can be created in the duct line 45 which draws upward through the hood 44 any smoke generated by the burning combustible parts of the car body. The products of incomplete combustion thus drawn up through the hood 44 are forced by the blower 14 into the cupola 13 where combustion is completed so that no smoke or soot escapes outward through the cupola stack 15, and air pollution is thus prevented.

As the car body moves slowly up the ramp of the chain conveyor 10 within the housing 11, the body temperature continuously rises until at approximately 600° F. all of the zinc and white metal parts melt and drop off through the open conveyor for later harvesting, these parts dropping off toward the lower end of the conveyor into a bed of dirt or sand therebeneath. As the car body continues further up the ramp its temperature continues to rise further until toward the upper end of the conveyor it has risen to approximately 1200 to 1400° F. at which temperature any of the aluminum metal parts present melt and also drop off for subsequent recovery.

By the time the car body gets to the top of the ramp and has been moved off of the conveyor onto the skid plates preparatory to dropping it into the cupola, all that remains is steel at a temperature of substantially 1600° F., the melting point being approximately 2600° F. As before described, the heated car body then slides into the cupola which melts it down to mill acceptable steel in about four minutes. Typically, the length of the ramped chain conveyor 10 is sufficiently long to take about five cars, each car being sequentially ignited as it enters the conveyor housing. Since it takes approximately four minutes to melt down a car body once it is deposited into the cupola with an initial body temperature on the order of 1600° F., the five car ramp requires about twenty minutes for each car to progress from the bottom of the conveyor to the point of deposit into the cupola.

Since the enclosed housing 11 is thermally well insulated, the heat of combustion of each car rising through the housing is applied to each car body at a successively higher point on the chain conveyor. Consequently, each car body is heated not only by combustion of its own combustible materials but is also heated by the heat of combustion of each car lower down on the conveyor. The rate of combustion and car body heating is controllable within reasonably wide limits by the selective use of the fuel fed auxiliary jet burners 23 and the air blower 21 which are capable of heating the car bodies to the desired temperatures within a time range which may be varied in accordance with the desired rate of feed into the cupola 13. For example if it is desired to have the car bodies heated to 2000° F. instead of 1600° F. at the point of deposit into the cupola, then the cupola melting time will be substantially reduced and the conveyor may run at a faster rate. Accordingly, the speed of the chain conveyor 10 may be accommodated to the fastest rate at which the car bodies can be melted down in the cupola.

The melted steel is tapped from the cupola through the pour hole 47, while the slag is drawn off through sag hole 48. Finally, when the system has been shut down, the doors 20 may be opened and the various lower temperature melting metals may be collected from their physically separated regions beneath the length of the conveyor.

Having now described my invention in connection with a particularly illustrated embodiment thereof, it will be appreciated that variations and modifications may now naturally occur from time to time to those persons normally skilled in the art without departing from the essential spirit or scope of my invention, and accordingly it is intended to claim the same broadly as well as specifically as indicated by the appended claims.

What is claimed as new and useful is:

1. A method for converting scrap automobile bodies into high grade pigs or billets containing very low percentages of contaminating substances, consisting of the steps of, operatively coupling a car body to a conveyor at a loading station for movement to a discharge station through a thermally insulated housing, igniting the combustible parts of the car body and moving the car body through the housing at a predetermined rate of speed and causing the temperature of the metal parts of the body to rise to approximately 600° F. nearer to the loading station end of the housing than to the discharge station end so that the low temperature melting metals melt and drop off, continuing to move the car body toward the discharge station and causing the temperature of the metal parts of the body to rise to the range of 1200° F. to 1400° F. when the body is nearer to the discharge station end than to the loading station end so that the intermediate temperature melting metals melt and drop off, continuing to raise the temperature of the body to at least 1600° F. by the time it reaches the discharge station and then depositing it directly into a furnace which is at an operating temperature in excess of 2600° F. to reduce the body to molten steel, and tapping the furnace to form billets or pigs from the molten steel.

2. The method a set forth in claim 1 further including the preliminary step of removing from the body all chromium containing body parts and all copper containing parts.

3. The method as set forth in claim 1 further including the step of withdrawing from the insulated housing as they are formed therein the products of incomplete combustion and injecting the same into the furnace to complete the combustion thereof.

4. The method as set forth in claim 1 further including the preliminary step of removing from the body all chromium containing body parts and all copper containnig parts and the step of withdrawing from the insulated housing as they are formed therein the products of incomplete combustion and injecting the same into the furnace to complete the combusion thereof.

5. The method as set forth in claim 1 wherein the step of igniting the combustible parts of the car body is carried out after the latter has been moved into the termally insulated housing.

6. The method as set forth in claim 1 wherein the car bodies are moved upward through the housing from the loading station to the discharge station in a series, one following closely behind another so that the heat of combustion generated by each car also further heats each car above it in the series by utilization of the chimney effect.

7. The method as set forth in claim 6 wherein the rate of movement of the car bodies through the housing is timed to continuously deposit car bodies into the furnace at intervals such that each car body so deposited is sufficiently melted down when the next succeeding car body is deposited as to prevent pile up in the housing of cars moving through the housing toward the furnace.

8. A method of converting scrap automobile bodies into high grade pigs or billets containing very low percentages of contaminaitng substances, consisting of the steps of, placing a car body in one end of an elongated thermally insulated housing, igniting the combustible parts of the car body, moving the car body through a heating and collecting first zone of the housing and causing the temperature of the non-ferrous metal parts of the body to rise in said first zone to a sufficient degree to melt and drop off of the body in said first zone for subsequent independent collection of said non-ferrous metals, moving the car body into a second zone of the housing and causing the temperature of the steel parts of the body to rise to at least 1600° F. by the time the car body reaches the other end of the housing, then depositing the car body directly into a furnace which is at an operating temperature sufficiently high to reduce the body to molten steel, and tapping the furnace to form billets or pigs from the molten steel.

9. The method as set forth in claim 8 wherein the rate of movement of the car bodies through the housing is timed to continuously deposit car bodies into the furnace at intervals such that each car body so deposited is sufficiently melted down when the next succeeding car body is deposited as to prevent pile up in the housing of cars moving through the housing toward the furnace.

10. A method of converting scrap automobile bodies into high grade pigs or billets containing very low percentages of contaminating substances, consisting of the steps of, placing a car body in one end of an elongated thermally insulated housing, igniting the combustible parts of the car body, moving the car body through the housing and causing the temperature of the steel parts of the body to rise to at least 1600° F. by the time the car body reaches the other end of the housing, then depositing the car body directly into a furnace which is at an operating temperature sufficiently high to reduce the body to molten steel, tapping the furnace to form billets or pigs from the molten steel and withdrawing from the insulated housing as they are formed therein the products of incomplete combustion and injecting the same into the furnace to complete the combustion thereof.

References Cited

UNITED STATES PATENTS

| | | | |
|---|---|---|---|
| 2,238,155 | 4/1941 | Cohen | 75—44 X |
| 3,234,010 | 2/1966 | Mahoney | 75—43 |
| 3,320,051 | 5/1967 | Lieberman | 75—43 |
| 3,323,908 | 6/1967 | Tezuka | 75—63 |
| 3,367,769 | 2/1968 | Schott | 75—43 |

OTHER REFERENCES

Handbook of Cupola Operation; American Foundryman's Assn.; Chicago, Ill.; 1946; p. 6.

L. DEWAYNE RUTLEDGE, Primary Examiner

HENRY W. TARRING, III, Assistant Examiner

U.S. Cl. X.R.

75—63, 65